United States Patent
Cambridge

[19]

[11] Patent Number: 5,162,781
[45] Date of Patent: Nov. 10, 1992

[54] ORIENTATIONAL MOUSE COMPUTER INPUT SYSTEM

[75] Inventor: Vivien J. Cambridge, Slidell, La.

[73] Assignee: Automated Decisions, Inc., Ridgefield, Conn.

[21] Appl. No.: 735,106

[22] Filed: Jul. 23, 1991

Related U.S. Application Data

[63] Continuation of Ser. No. 416,142, Oct. 2, 1987, abandoned.

[51] Int. Cl.$^5$ ................................................ G09G 3/02
[52] U.S. Cl. .................................. 340/710; 360/706; 360/709
[58] Field of Search ............... 340/706, 709, 710; 273/148.13; 74/471; 250/221

[56] References Cited

U.S. PATENT DOCUMENTS

| | | | |
|---|---|---|---|
| 4,045,789 | 8/1977 | Bristow | 340/725 |
| 4,390,873 | 1/1983 | Kirsch | 340/710 |
| 4,506,336 | 3/1985 | Hird | 364/518 |
| 4,555,590 | 11/1985 | Kishi et al. | 178/18 |
| 4,564,835 | 1/1986 | Dhawan | 340/710 |
| 4,661,810 | 4/1987 | Himelstein et al. | 340/709 |
| 4,686,329 | 8/1987 | Joyce | 340/710 |
| 4,686,522 | 8/1987 | Hernandez et al. | 340/709 |
| 4,701,752 | 10/1987 | Wang | 340/723 |
| 4,745,405 | 5/1988 | Himelstein et al. | 340/709 |
| 4,814,553 | 3/1989 | Joyce | 178/18 |
| 4,887,230 | 12/1989 | Noguchi et al. | 340/709 |

FOREIGN PATENT DOCUMENTS 60-193032 10/1985 Japan .

OTHER PUBLICATIONS

IBM Technical Disclosure Bulletin, vol. 27, No. 6, Nov. 1984, entitled "Mouse" by H. Nomura and A. Saitoh, pp. 3423-3424.
Artwick, "Microcomputer Displays, Graphics, and Animation", Prentice-Hall, N.J., 1985, p. 308.
Stephen K. O'Brien "Turbo Pascal" McGraw-Hill, Calif. 1988 pp. 192-214.
Macintosh "Macpaint" Curpertine, Calif. 1983.

*Primary Examiner*—Alvin E. Oberley
*Assistant Examiner*—Doon Yue Chow
*Attorney, Agent, or Firm*—Ross, Howison, Clapp & Korn

[57] ABSTRACT

A system for computer cursor control, interactive draw graphics, and interactive data entry in which changes in the angular orientation of a computer mouse device as well as changes in its location of a flat surface are used to control the angular orientation of a cursor or pointer on a computer display screen, the angular orientation of objects and text on a computer scene, and/or values or variables in computer applications programs.

12 Claims, 6 Drawing Sheets

ORIENTATIONAL MOUSE COMPUTER INPUT SYSTEM

This application is a continuation of application Ser. No. 416,142, filed Oct. 2, 1989, now abandoned.

TECHNICAL FIELD OF THE INVENTION

The present invention relates to interactive information handling systems, and, more particularly, to a system for controlling computer display information, such as cursors, pointers, and graphics objects, by rotation and lateral movement of a hand-held data input device to control the angular orientation of such display information.

BACKGROUND OF THE INVENTION

A mouse data entry system is generally illustrated in FIG. 1 and allows a user to interactively enter data into a computer in an easy, natural manner. Such a system typically comprises a hand-held, movement sensitive device 20, a mouse interface 22, cursor driver circuitry 24 for controlling the cursors, pointers, and/or graphics objects 26 on a display screen 28, and software for transmitting mouse parameters such as device location to application programs 30. The functional distinction between the mouse interface 22 and the cursor driver 24 is often omitted. Movement of the device 20 across a flat surface causes cursor 26 on display screen 28 to move or variables in a computer application program to change as illustrated in FIG. 2. This data entry system allows a user to "point" on the display screen or to affect the execution of application programs.

Examples of the use of such data entry systems include: 1) cursor control in which the system is used to move a cursor or pointer across a computer screen for the purpose of quickly identifying objects or text appearing on the screen; 2) painting and drawing in which the mouse system is often used to control pens and paintbrushes to "draw" and "paint" on the screen in graphics application programs; 3) creation and metamorphosis of graphics objects where the mouse system can also be used to control the creation of graphics primitives such as circles, rectangles, polygons, etc. and to build and change the shape of 2-dimensional and 3-dimensional objects in the computer and 4) manipulation of text and graphics where the mouse system can be used to interactively move, delete, scale, flip, and rotate text and graphics objects on the computer screen.

Currently mouse input systems, as defined above, allow the user to directly control only variables that are related to changes in the x and y coordinates of the device as it is moved across a flat surface. Hence the user can currently only change information on the computer screen or in application programs by changing the location of the device.

Current mouse interactive data entry systems further do not allow users to rotationally control a cursor, pointer, or the orientation of a graphic object or enter data into an application program by rotating the movement sensitive device. Rather, as stated above, current systems allow the user to control the position of the cursor on a screen and to enter data in application programs that is related to the position (x and y coordinates) of the movement sensitive device.

Interactive graphics systems exist where graphics objects and text can be rotated indirectly by moving a movement sensitive device in a circular motion so that the cursor on the display screen describes an arc around the center of the object. In those systems the change in the orientation of the object is related to the change in the slope of a line connecting the cursor and the center of the rotating object, where the position of the cursor is related to the position of the movement sensitive device. The operation of such a system is illustrated in FIG. 3 and is described in U.S. Pat. Nos. 4,661,810 and 4,745,405. Since these methods operate in an indirect fashion their effectiveness is sub-optimal. For example, these existing systems do not allow changes in the lateral movement of the graphics objects to take place simultaneously with rotating action. Indirect operation may also increase tediousness, and the current systems do not accommodate rotating cursors and paintbrushes.

A movement sensitive device of the mouse data entry system may operate mechanically or electronically. In the case of a mechanical device, movement across a planar surface is detected with one or more balls or wheels and is translated into measures of the distance traveled in the x and y directions.

The hand-held movement sensitive device of the mouse data entry system may also detect changes in position electronically. Such electronic devices include active or passive tablets which are imprinted with regular or irregular grids. The device electrically couples with the grid of the tablet or transmits and detects waves reflected by the grid of the tablet. This interaction with the tablet is used to determine the lateral position of the movement sensitive device on the tablet. Mouse movement and button states are transmitted to the mouse interface and are used to control the cursor, pointer, and/or graphics objects.

The current art includes several hand-held devices with physical configurations such that their output can be used to sense changes in their orientation (*IBM Technical Disclosure Bulletin*, Vol. 27 No. 6, Nov., 1984 by Nomura and Saitoh, Japanese Pat. No. 60-193032 issued to Mitsubishi, and U.S. Pat. No. 4,814,553 to Advanced Robotics Technology, Inc.). Current systems using the abovementioned devices generate orientation information in the process of determining a more precise estimate of the absolute position of the hand-held device. For example, in the case of the mechanical device comprising two balls (Numor, 1984 and Mitsubishi, 1985), the x and y coordinates measured by the hand-held device are in a coordinate system which is defined by the angular orientation of the mouse and which therefore changes with device orientation. The systems proposed by Nomura and by Mitsubishi attempt to use orientation of the mouse to continuously correct the x and y coordinates to correspond to a constant coordinate system.

The mouse interface of a data input system typically comprises an electronic device, hardware or software, for converting movement data which it receives from the movement sensitive device, into display screen distance units. In addition to this task, the mouse interface keeps track of mouse interrupts. These interrupts, which are requested by an application program, are used by the mouse interface to interrupt the application program or its subroutines when a specific set of mouse events occurs, such as when a button is pressed. Besides servicing the moving device and communicating with application programs, the mouse interface must maintain a pointer or a cursor on the display screen. This function can be performed directly by the mouse interface or it can be accomplished by a display screen hardward dependent cursor driver. Where a cursor driver is used, the mouse interface passes the coordinates of the cursor to the cursor driver which places a cursor on the display screen at the requested coordinates.

A need has thus arisen for a mouse data entry system which permits the user to rotate a cursor, pointer, or graphics object and interactively enter data into the computer by rotating a hand-held, movement sensitive device on a flat surface area. Such a system must also provide for lateral movement of cursor, pointer, or graphics objects (either simultaneously or non-simultaneously with rotating motion) by moving the device laterally. A need has further arisen for an improved cursor or pointer control to thereby allow better cursor and pointer use for user/program interaction in interactive application programs.

SUMMARY OF THE INVENTION

In accordance with the present invention, the angular orientation of the cursor or pointer on a display screen can be changed by turning a data input mouse. Therefore, the angular orientation of a cursor, pointer, or some other form of graphics can conveniently be used as an additional variable in interactive editing and data entry. The present invention provides for an interactive data entry into graphics programs, paint programs, games, and other application programs by rotating a mouse device as well as moving the mouse laterally, rendering programs more powerful and easier to use.

In accordance with another aspect of the present invention, painting and drawing programs can be used with the present system to control the angular orientation of a paintbrush or a pen by rotating a hand-held device, giving the user an option which is available in the "real world" situation for creating effects. This aspect of the present invention can significantly improve the quality and ease of use of these programs, as well as the output which they create.

In accordance with other aspects of the present invention, application programs can use the orientation of the cursor as an additional, easily controlled variable for user input; 3-dimensional and 2-dimensional graphics programs which create, move, and/or alter objects can allow the user to build graphics primitives such as circles, ellipses, curves, and surface patches by rotating the mouse as well as moving it; and graphics programs which allow movement and rotation of graphics objects and blocks of text can allow users to perform this operation, move and rotate, in one step since the system of the present invention provides for the rotating action of manipulated objects by turning the mouse.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
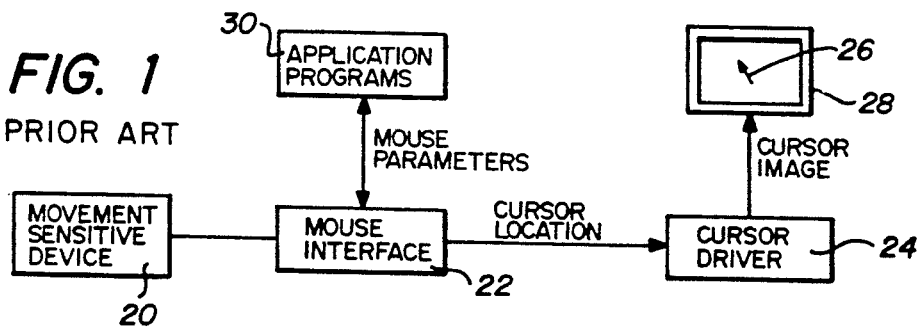
FIG. 1 is a block diagram of a mouse data entry system as is known in the current art.
Figure 2:
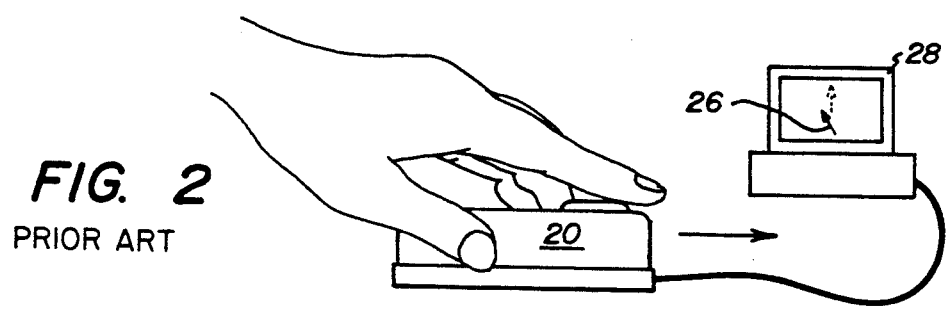
FIG. 2 illustrates the operation of a typical mouse data entry system shown in FIG. 1.
Figure 3:
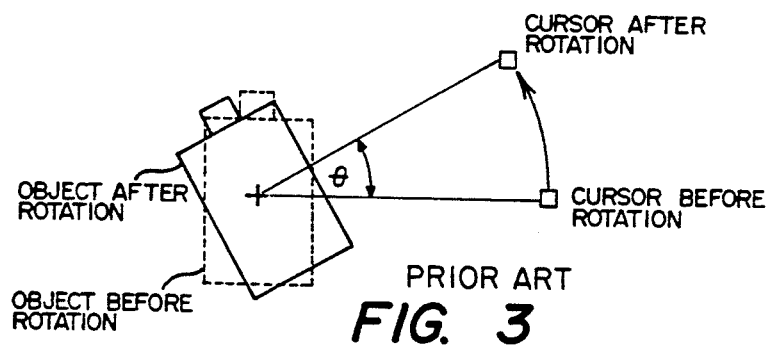
FIG. 3 illustrates a system for interactively rotating objects on a computer screen in interactive draw graphics systems.
Figure 4:
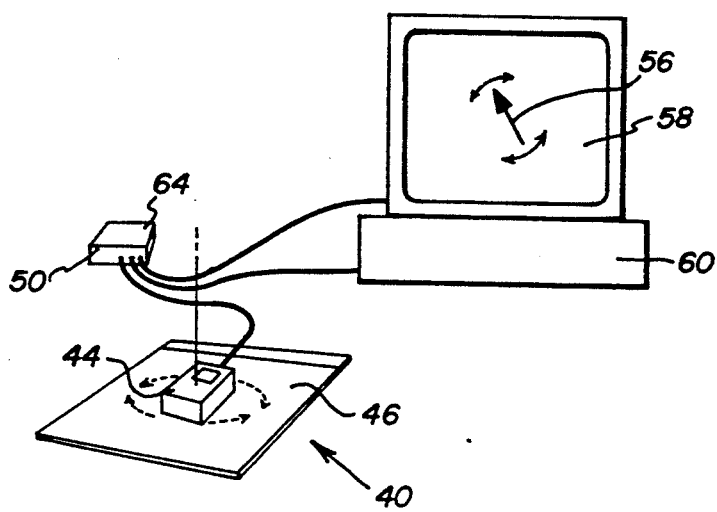
FIG. 4 illustrates the operation of the present orientational interactive input system.
Figure 5:
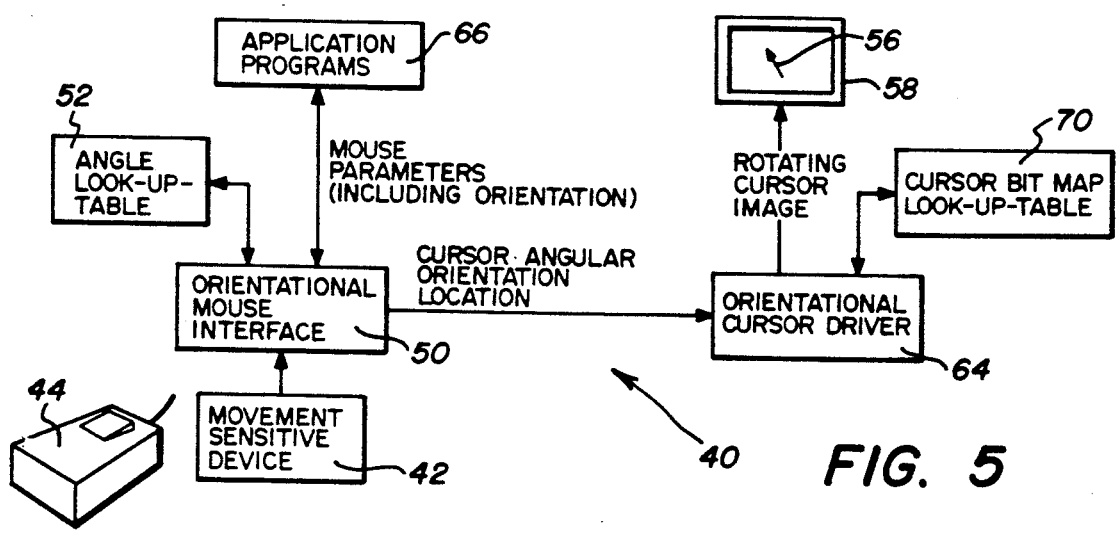
FIG. 5 is a block diagram of the present orientational interactive input system.

Referring simultaneously to FIGS. 4 and 5, the present interactive mouse system is illustrated and is generally identified by the numeral 40. Mouse system 40 includes a movement sensitive device 42 which is sensitive to changes in its angular orientation as well as changes in its lateral position. Device 42 may comprise, for example, a hand-held mouse 44 which is moved over a tablet 46 and may also include an orientation sensitive stylus and tablet system, a hand-cursor and tablet, or any hand-held interactive input device provided that it is sensitive to changes in orientation as well as lateral position. Mouse system 40 further includes a mouse interface 50 which may be hardware or software implemented, and functions to determine the angular orientation or changes therein of mouse 44 based upon the output generated by mouse 44.

Determination of the angular orientation of the mouse 44 is preferably done through a search in a look-up-table 52 which contains precalculated values of change in angle vs. device output parameters, but it may be achieved by computations which involve geometrical transformations. Mouse interface 50 further functions to keep track of the angular orientation of mouse 44 as well as the lateral position of mouse 44; determine and keep track of the angular orientation of a cursor 56 on a computer display screen 58 associated with a computer 60 as well as the lateral position of the cursor 56 on the computer display screen 58; transmit to a cursor driver 64 the coordinates of the cursor 56 as well as its orientation on the computer display screen 58; and transmit to graphics, paint, and other computer application programs 66 the orientation of the mouse 44 and of the cursor 56 in addition to other mouse 44 parameters such as position and button states. As used herein the term "image" or "cursor" displayed on display screen 58 will include, but is not be limited to, cursor 56, pointers, graphic objects, and text.

Cursor driver 64 is capable of displaying an image on display screen 58 at variable orientations, which cursor driver 64 uses a cursor bit map look-up-table 70 to relate cursor 56 orientation to appearance of the cursor 56 on the display screen 58. For example, if a desired cursor angle is determined to be 1 radian, the cursor driver 64 obtains a bit map from the cursor bit map look-up-table 70 which corresponds to this angle (1 radian) and uses this bit map to place a visual representation of a cursor 56 on the display screen 58 which is oriented according to that angle. A keyboard and other peripherals which are part of the typical arrangement of interactive information handling systems are included within computer 60.

Figure 6:
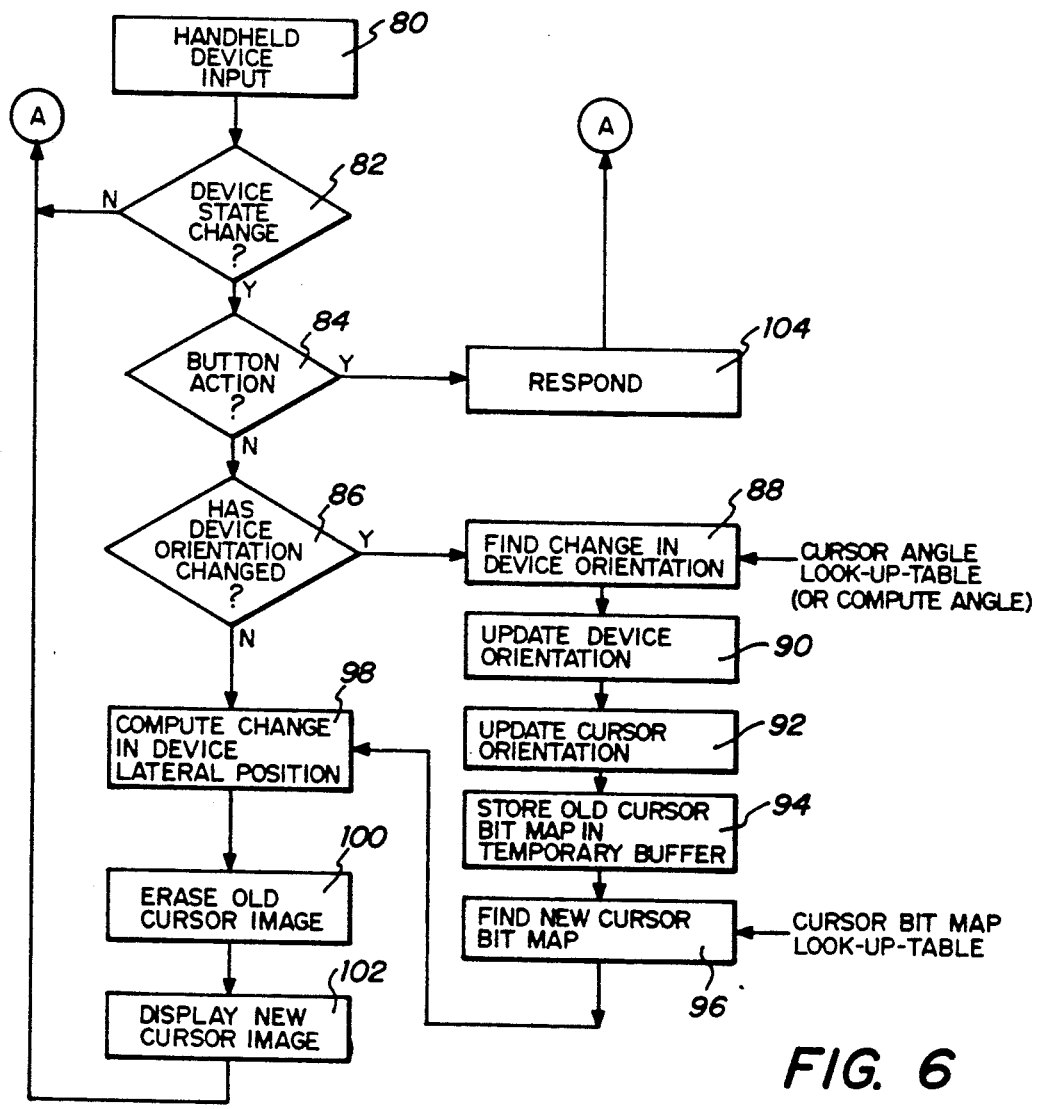
FIG. 6 is a flowchart of the present orientational interactive input system.

A flowchart of the system 40 of the present invention is presented in FIG. 6. In this description it is assumed that the system 40 uses an orientationally sensitive handheld device to drive a rotating cursor, but the flowchart also applies to rotating pointers and other forms of rotating bit mapped graphics. The system 40 accepts input from the movement sensitive device such as mouse 44 in block 80 and determines in block 82 from the input if the state of the device 44 has changed, that is, if the device 44 has moved or turned, or if buttons have been pressed or released.

If the system 40 determines a change in device state, and it finds that no buttons were pressed, block 84, the system 40 checks in block 86 to see if there has been a change in the angular orientation of mouse 44. If a change in the orientation of the mouse 44 is detected, the system 40 computes the change in the angular orientation at block 88 and updates the angle of the device at block 90 as well as the angle of the cursor 56, block 92. In block 94, the bit map (image) corresponding to the current cursor orientation is stored in a temporary buffer for the purpose of later erasing the current bit map image.

The system 40 searches a look-up-table for the bit map of the cursor which corresponds to its current orientation at block 96. The operations performed at blocks 92, 94, and 96 may be omitted if a cursor is not displayed. In block 98 the system uses the mouse 44 input to determine any change in the lateral position of mouse 44, and the system updates the cursor coordinates using the computed change in the lateral position of the mouse 44. The system 40 erases the old cursor in block 100 and then places a new cursor 56 on the display screen 58 which corresponds to the new cursor location and angular orientation at block 102. At node A, the system may surrender control to another system operating on the computer 60, or it may return to block 80 for subsequent mouse 44 input. Blocks 88 and 96, computation of cursor angle and bit map, preferentially use look-up-tables as previously explained.

Figure 7:
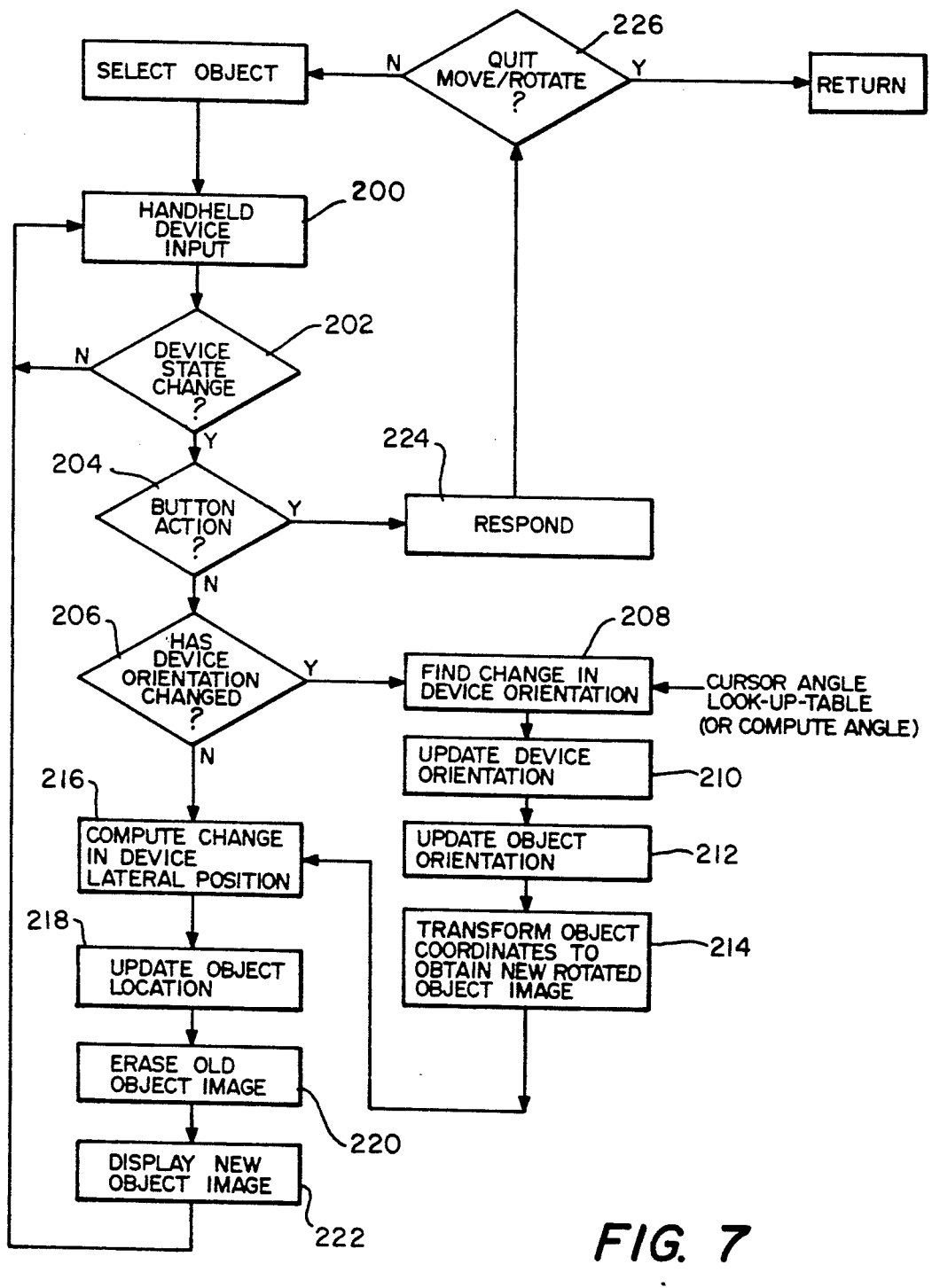
FIG. 7 is a flowchart of an example of a draw graphics system which incorporates the present system.
Figure 8:
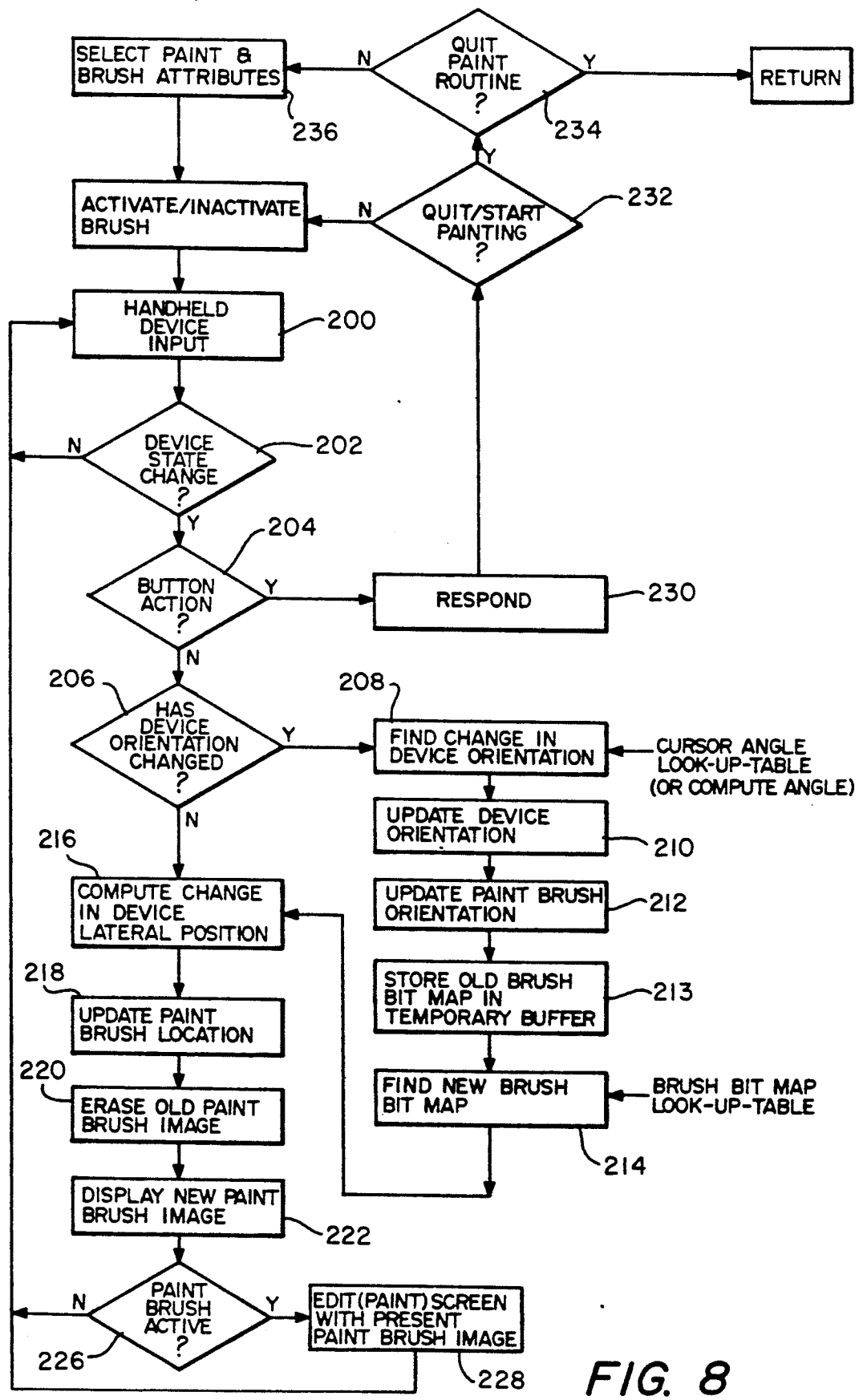
FIG. 8 is a flowchart of an example of a paint graphics system which incorporates the present system.

Forms of the present system 40 may be advantageously incorporated in particular application programs such as draw graphics systems. FIG. 7 is a flowchart of an example of a draw system where the orientational mouse input system is used to move and rotate graphics objects. A second example of an application program incorporating the system is shown in FIG. 8 where the system is used to control the angle of a paintbrush in a paint program.

Referring to FIG. 7, once the move/rotate option is selected in the system's main menu, the system accepts input from the mouse 44 at block 200 and determines at block 202 from this input if the state of the mouse 44 has changed, that is, if the mouse 44 has moved or turned, or if buttons have been pressed or released.

If the system 40 determines a change in mouse 44 state, and it finds that no buttons were pressed, block 204, the system 40 checks at block 206 to see if there has been a change in the angular orientation of the mouse 44. If a change in the orientation of the mouse 44 is detected, the system 40 computes the change in the angular orientation at block 208 and updates the angle of the mouse 44 at block 210 as well as the angle of the rotating object 56, block 212. The system 40 uses the change in the object's orientation or the object's new orientation to transform the object and thereby obtain the image of the object which corresponds to the rotated object at block 214.

At block 216 the system 40 uses the mouse 44 input to determined any change in the lateral position of the mouse 44, and the system 40 updates the object's coordinates using the computed change in the lateral position of the mouse 44 device at block 218. The system 40 erases the image of the object or its surrogate at block 220 and then places a new image on the screen which corresponds to the current location and angular orientation of the object or its surrogate at block 222. The system 40 interprets any button action at block 224 and takes required action. At block 226, based on user input at block 224, the system 40 may terminate the move/rotate operation and surrender control to the main menu of the system 40 or for continued move/rotate operations. Block 208, computation of object angle, preferentially uses a look-up-table previously explained.

Referring now to FIG. 8, if the paint option is selected in the system's main menu, the system 40 accepts input form the movement sensitive device such as a mouse 44 at block 200 and determines at block 202 from this input if the state of the device has changed, that is, if the device has moved or turned, or if buttons have been pressed or released.

If the system 40 determines a change in device state, and it finds that no buttons were pressed, block 204, the system 40 checks at block 206 to see if there has been a change in the angular orientation of the mouse 44. If a change in the orientation of the mouse 44 is detected, the system 40 computes the change in the angular orientation at block 208 and updates the angle of the mouse 44 at block 210 as well as the angle of the rotating paintbrush 56, block 212. At block 213, the angle corresponding to the current paint brush bit mapped image is stored in a temporary buffer for the purpose of later erasing the current paintbrush image.

The system 40 uses the change in the paintbrush's orientation or the paintbrush's new orientation to obtain the image of the rotated paintbrush from the cursor memory registers at block 214. At block 216 the system 40 uses the mouse 44 input to determine any change in the lateral position of the mouse 44, and it updates the paintbrush's coordinates using the computed change in the lateral position of the mouse 44 at block 218. The system 40 erases the image of the paintbrush at block 220 and then places a new image on the screen which corresponds to the current location and angular orientation of the paintbrush at block 222. If the system 40 finds at block 226 that the paint function is activated, that is, if the system's editing action is active, the system 40 determines pixels on the screen which lay on a path that corresponds with mouse movement from its previous position and orientation to its present position and orientation. The system then edits the computer display screen by altering these pixels according to the paint attributes at block 228.

The system 40 interprets any button action at block 230 and takes required action. At block 232, based on user input at block 230, the system 40 may stop or start painting. If user input demands stop/start painting, then the system 40 activates or deactivates the paintbrush, depending on the present mode of the paintbrush. If user input did not demand stop/start painting, the system 40 may terminate the paint operation and surrender control to the main menu of the system 40 at block 234, or the system 40 moves to block 236 to reset paint and paintbrush attributes.

Figure 9:
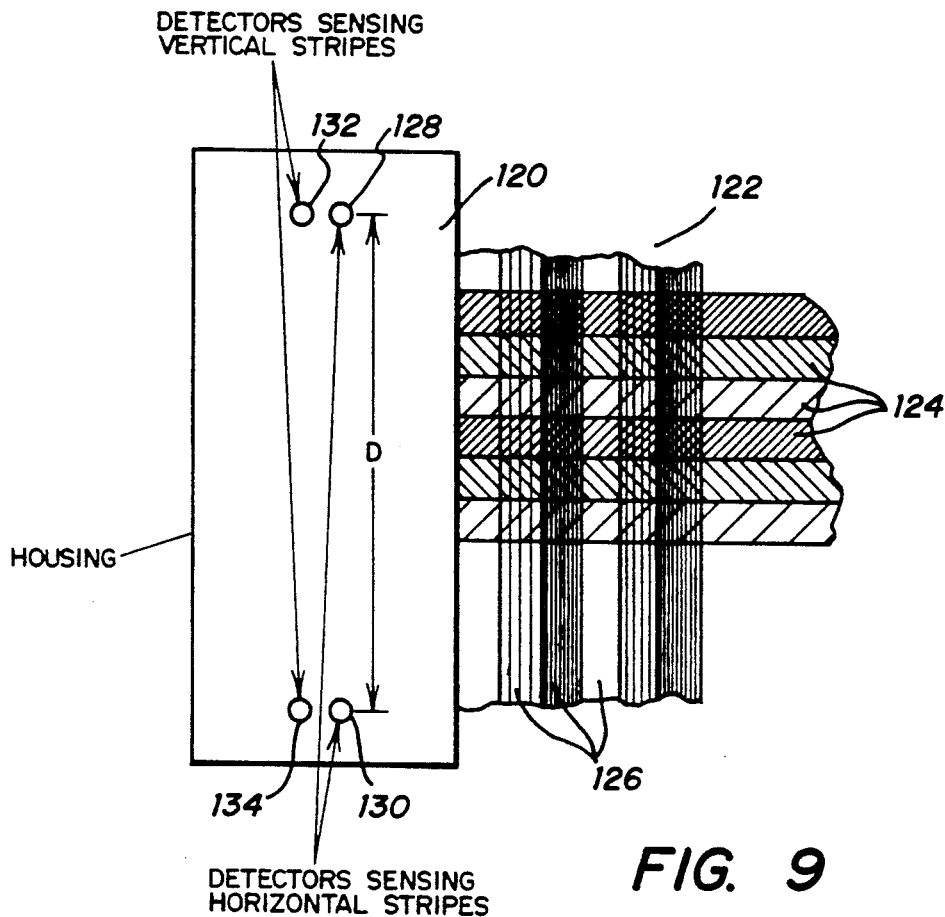
FIG. 9 illustrates a non-mechanical movement sensitive device which senses changes in the orientation of the device.

System 40 includes, for example, a non-mechanical movement sensitive device, an interface for this device implemented in the form of a microprocessor, and a driver capable of displaying a cursor or pointer with variable angular orientation. Referring now to FIG. 9 an embodiment of the present system 40 includes a non-mechanical movement sensitive device 120 and a pad 122 which has been imprinted with a regular grid of conductive and/or reflective stripes, where horizontal stripes 124 printed on the pad 122 consist of material with different conductive or reflective properties than the vertical strips 126. The movement sensitive device 120 includes two detectors 128 and 130 which are capable of sensing the horizontal stripes 124 and which are spaced a specific distance D apart. Additionally, the device 120 includes two detectors 132 and 134 capable of sensing the vertical stripes 126, which detectors are also spaced distance D apart.

Figure 10A:
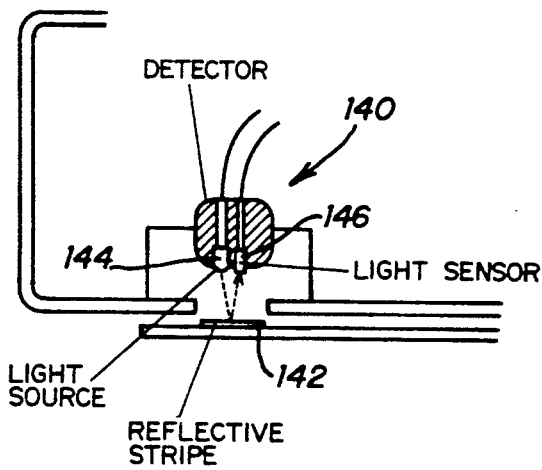
FIG. 10 illustrates an example of non-mechanical detectors.
Figure 10B:
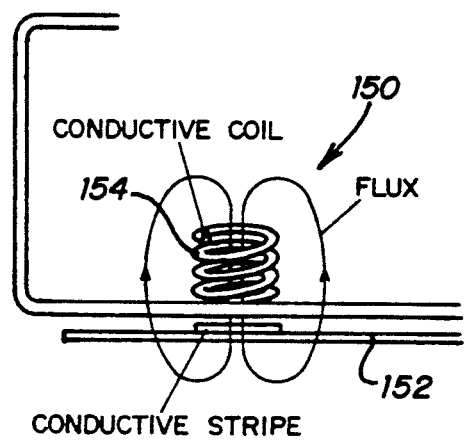

FIG. 10A illustrates the use of a photosensitive device 140 in which reflective stripes 142 are sensed by light sources 144 and photosensitive sensors 146. The light source 144 emits light with a specific wavelength which is reflected by the stripes 142 if the source moves across them and subsequently sensed by the sensor 146. FIG. 10B illustrates the use of an electromagnetic device 150 in which conductive stripes 152 are sensed through conductive coils 154 which are electrically coupled to the stripes 152 when the coils 154 move across them.

The detectors capable of sensing horizontal stripes do not sense vertical stripes, and the detectors capable of sensing vertical stripes do not sense horizontal stripes. In the case of electromagnetic detectors, sensing can be achieved by printing stripes in the horizontal direction which have different conductives than stripes in the vertical direction and designing the sensors to respond to stripes with specific corresponding conductivities. When photosensitive sensors are used, the stripes in the horizontal direction may have different reflective properties than those in the vertical direction. In an alternative configuration the horizontal stripes may be sensed by conductivity while the vertical stripes are sensed by reflectivity or vice versa.

Figure 11:
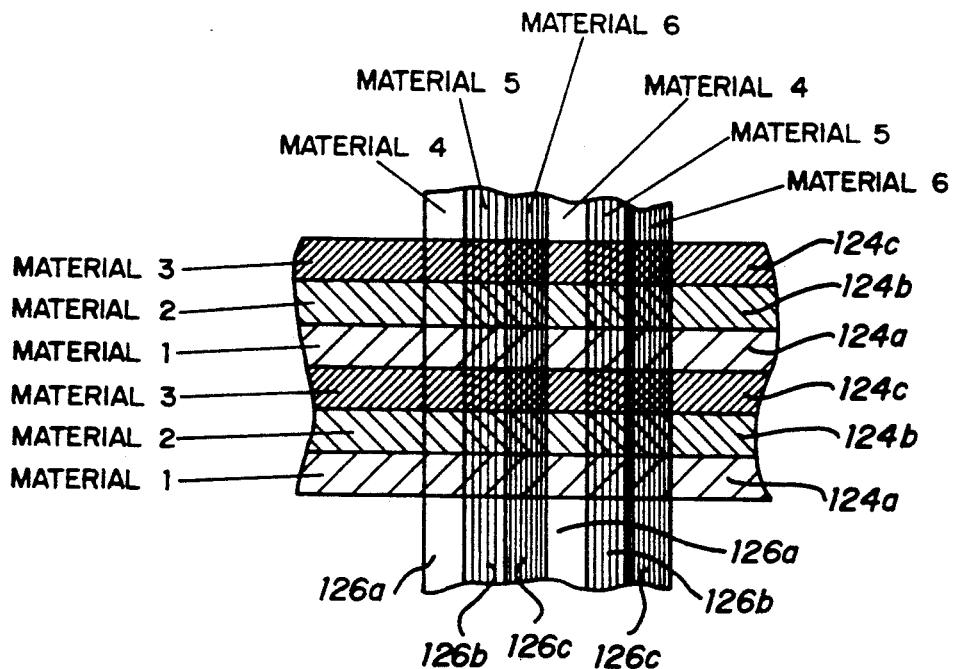
FIG. 11 illustrates the printing of the tablet for use with present orientational movement sensitive device.

As shown in FIG. 11, the vertical stripes 126a, 126b, and 126c and horizontal stripes 124a, 124b, and 124c are printed in a regular pattern of at least three alternating materials with different properties such as, for example, non-conductive, conductivity C1, and conductivity C2. The use of more than two different materials ensures that the direction of movement can be determined, when the detector moves from one stripe to another, from the change in the sensed property of the stripe.

The device counts the number of vertical lines crossed by each vertical line sensor and the number of horizontal lines crossed by each horizontal line sensor and reports these counts to the mouse interface periodically. The device also includes buttons for additional user input.

Figure 12:
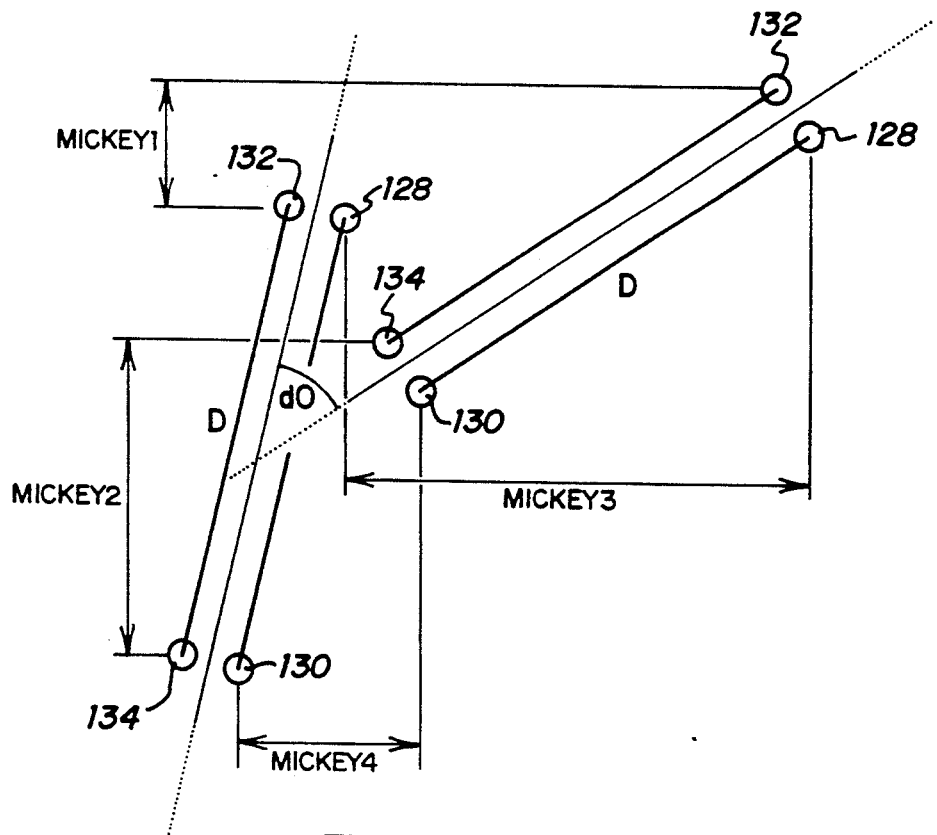
FIG. 12 shows a schematic diagram of the orientation change for the present orientational movement sensitive device.

System 40 may also include a mouse interface 50 which is capable of determining changes in the orientation of the mouse 44 from the counts which it transmits to the interface. In the case of the device 120 described above, and referring to FIG. 12, the changes in the orientation of device 120 (dO) and location can be determined with the procedure outlined below. In this method, a look-up-table is used to relate device output to angular orientation changes.

$$dO = 2 \cdot SIGN \cdot ARCSIN \left\{ \frac{[(mickey1 - mickey2)^2 + (mickey3 - mickey4)^2]^{\frac{1}{2}}}{2D} \right\} \quad (1)$$

where dO is the change in the orientation of the device
mickey1 is the count (positive or negative) at sensor 132 (Figure 9)
mickey2 is the count (positive or negative) at sensor 134 (Figure 9)
mickey3 is the count (positive or negative) at sensor 128 (Figure 9)
mickey4 is the count (positive or negative) at sensor 130 (Figure 9)
D is the distance between sensors 134 and 134 and between sensors 128 and 130

SIGN is an integer which has a value −1 or +1 and which is dependent on the mickey counts and the device orientation. This integer represents the direction in which the device rotates and it is determined as follows:

let m1 = mickey1 − mickey2  (2)
m2 = mickey3 − mickey4  (3)
Q = quandrant of device orientation, then
SIGN is given by the following table:

| m1 | m2 | Q | SIGN |
|---|---|---|---|
| positive | positive | 2 | +1 |
| positive | positive | 4 | −1 |
| positive | negative | 1 | +1 |
| positive | negative | 3 | −1 |
| negative | positive | 1 | −1 |
| negative | positive | 3 | +1 |
| negative | negative | 2 | −1 |
| negative | negative | 4 | +1 |

A look-up table is created in the memory of interface 50 where absolute values of changes in device orientation (ABS(dO)) are computed and tabulated for a range of values of (mickey1−mickey2) and (mickey3−mickey4).

When the mouse interface 50 receives a report of the counts mickey1, mickey2, mickey3, and mickey4, the interface computes
mickey1−mickey2
mickey3−mickey4 these values are used to obtain ABS(dO) from the look-up-table. The system 40 then determines the quadrant Q from present device orientation and finds the value of the integer SIGN. Finally, orientation change is then given by:

$$dO = SIGN \times ABS(dO) \quad (4)$$

The interface 50 also computes the changes in the location of the device. These changes in the x and y coordinates (dx and dy resp.) are computed as follows:

$$dx = sx \times (mickey1 + mickey2)/2 \quad (5)$$

$$dy = sy \times (mickey3 + mickey4)/2 \quad (6)$$

where:
sx is a scaling factor in the x direction
sy is a scaling factor in the y direction
The mouse interface 50 stores the device 120 (FIG. 9) angular orientation and lateral position in memory, and continuously updates these positions after computing dO, dx, and dy.

Finally, the mouse interface 50 communicates with application programs, transmitting, upon request by the application programs, the position and angular orientation of the cursor and the movement sensitive device as well as button states and other mouse parameters. In the preferred embodiment the mouse interface 50 is a computer chip in the computer 60 or in the mouse 44, but it may also be installed as a software sub-system in the computer 60.

System 40 uses a cursor driver 64 to translate the mouse interface 50 determination of cursor rotation into the appearance of a rotating cursor or pointer on the display screen 58. The cursor driver 64 performs this task by referring to a bit map look-up-table 70 which contains a series of images (bit maps) of the cursor in orientations ranging from 0 to 360 degrees from the vertical. In the preferred embodiment of the present system 40, forty images are stored where the angle between cursors in consecutive images is 9 degrees. The cursor driver 64 rounds each reported cursor angle to the nearest multiple of 9, obtains the corresponding cursor image from the look-up-table 70, and displays it on the screen at the position indicated by the mouse interface 50.

Like the mouse interface 50, the cursor driver 64 of the preferred embodiment is hardware implemented, but it may also be installed in software.

It therefore can be seen that the present system provides for a display of a cursor, pointer, or graphics object which rotates as the hand-held device rotates, or which achieves graphics data entry and manipulation by turning the hand-held device.

It will be understood that any hand-held device which can sense changes in orientation and location may be used as the movement sensitive component of the present system. In such cases, the data generated by the mouse is used in the mouse interface to search a look-up-table for the corresponding angle, and the angle is used by the cursor driver to find and display a properly oriented cursor as the device is turned. The angle and cursor orientation are further used in application programs.

Whereas the present invention has been described with respect to specific embodiments thereof, it will be appreciated that various changes and modifications will be suggested to one skilled in the art, and it is intended to encompass such changes and modifications as fall within the scope of the appended claims.

What is claimed:

1. A mouse interactive data entry system for displaying an image on a display screen comprising:
    a hand-held device sensitive to movement across a surface;
    means for sensing changes in variable angular orientation of said hand-held device;
    means interconnected to said device for determining and storing the angle of orientation of said device corresponding to the desired angular orientation of the image to be displayed and angular changes to said device;
    image look-up-table memory storage means for containing a plurality of representations of the same image in a plurality of different angular orientations, said plurality of representations of the same image in a plurality of different angular orientations being prestored in said storage means prior to interactive manipulation of images on the display screen; and
    means for addressing said storage means for selecting from said storage means one of said stored representations of the image and for displaying on the display screen said selected image representation, said addressed and selected stored image representation corresponding in angular orientation to said stored angle of orientation of said device, thereby simulating rotation of the image on the display screen in response to rotation of said device.

2. The system of claim 1 wherein the image represents a cursor.

3. The system of claim 1 wherein the image represents a tool.

4. The system of claim 1 wherein the image represents a graphic object.

5. The system of claim 1 wherein the image represents text.

6. The system of claim 1 wherein said sensing means includes means for sensing changes in lateral position of said hand-held device and said means interconnected to said device includes means for determining and storing the location of said device.

7. The system of claim 6 and further including:
    means responsive to said sensing means for displaying on the display screen said selected image representation at a lateral position on the display screen corresponding to the lateral position of said hand-held device.

8. The system of claim 6 wherein said sensing means simultaneously senses changes in lateral position and angular orientation of said hand-held device.

9. The system of claim 1 wherein said device includes:
    a first set of detectors for sensing movement of said device in a first direction over a first plurality of reference lines;
    a second set of detectors for sensing movement of said device in a second direction over a second plurality of reference lines; and
    where said first plurality of lines is disposed non-parallel to said second plurality of lines.

10. The system of claim 9 wherein said first and second plurality of lines each includes at least three different lines of different inherent properties.

11. The system of claim 9 wherein said lines are of different reflectivity.

12. The system of claim 9 wherein said lines are of different magnetization.

* * * * *